(12) United States Patent
Morris et al.

(10) Patent No.: US 7,607,608 B2
(45) Date of Patent: Oct. 27, 2009

(54) GROUND HANDLING CART FOR SKID EQUIPPED AIRCRAFT

(75) Inventors: Russell W. Morris, Redmond, WA (US); Gerald D. Miller, Mercer Island, WA (US); Wesley F. Moore, Seattle, WA (US)

(73) Assignee: The Boeing Company, Chicago, IL (US)

( * ) Notice: Subject to any disclaimer, the term of this patent is extended or adjusted under 35 U.S.C. 154(b) by 321 days.

(21) Appl. No.: 11/420,667

(22) Filed: May 26, 2006

(65) Prior Publication Data

US 2009/0179395 A1    Jul. 16, 2009

(51) Int. Cl.
*B64F 1/00*    (2006.01)
(52) U.S. Cl. .................. 244/50; 244/116; 182/69.6
(58) Field of Classification Search ............ 244/50, 244/63, 114 R, 116, 171.3; 414/399, 631; 212/300, 302; 182/69.6
See application file for complete search history.

(56) References Cited

U.S. PATENT DOCUMENTS

| | | | | |
|---|---|---|---|---|
| RE24,306 E | * | 4/1957 | Doolittle | 244/63 |
| 3,210,029 A | * | 10/1965 | Brusch et al. | 244/114 R |
| 3,567,159 A | * | 3/1971 | Klein | 244/114 R |
| 4,102,463 A | * | 7/1978 | Schmidt | 414/631 |
| 4,223,856 A | * | 9/1980 | DiVincenzo | 244/50 |
| 4,511,015 A | * | 4/1985 | Purdy | 182/2.11 |
| 4,929,143 A | * | 5/1990 | Dohnalik | 414/723 |
| 6,702,064 B2 | * | 3/2004 | Huang | 182/141 |

OTHER PUBLICATIONS

Me-163 of 1944/45 used as a ground recovery system. http://www.xs4all.nl/~robdebie/me163/008.htm.

* cited by examiner

*Primary Examiner*—Rob Swiatek
(74) *Attorney, Agent, or Firm*—Tung & Associates (57) ABSTRACT

Ground carts to support skid equipped aircraft and to maneuver these craft safely on the ground during taxiing for take off, recovery, servicing, and transport to maintenance or storage. The ground carts provide the capability to minimize risks of damage to aircraft during towing by lifting the aircraft off the ground. Further, an embodiment of the ground cart of the invention includes the ability to rotate the aircraft on a cart platform up to 90° from the direction of forward motion of the cart to facilitate movement in and around the airport apron/hanger and to counter cross winds during take off. In addition, carts may be controlled from the aircraft, for example to provide for steering control until the aircraft is launched, cart braking, platform rotation, and other maneuvers.

18 Claims, 10 Drawing Sheets

GROUND HANDLING CART FOR SKID EQUIPPED AIRCRAFT

STATEMENT REGARDING FEDERALLY SPONSORED RESEARCH OR DEVELOPMENT

The United States government has a paid-up license in this invention and the right in limited circumstances to require the patent owner to license others on reasonable terms as provided by the terms of an applicable contract.

TECHNICAL FIELD

The present invention relates generally to ground carts used in the aviation and aerospace applications. More particularly, the present invention relates to ground carts adapted for use with skid equipped aircraft.

BACKGROUND

Certain specialized aircraft are designed to be light weight and skid equipped. These aircraft are typically unmanned, remotely controlled and are useful or potentially useful in a variety of applications. In a surveillance application, for example, to conduct aerial patrols along a border, or along a coast of a nation or state, or in remote areas to act as a substitute for a "cell tower" for cellular communications. It is desirable that these aircraft have the capability to remain aloft for long periods and traverse a significant area during that time. Accordingly, the aircraft carry a relatively large quantity of fuel to enable long endurance, whether deployed at high or low altitude.

Typically, these aircraft present a large external surface area (they tend to have very large wings relative to fuselage length) and that factor combined with light weight makes these craft vulnerable to cross winds. On the ground, the lack of wheeled landing gear, light weight and large surface area of the aircraft also combine to pose special issues in the launch, ground transport and recovery of these aircraft. These issues relate primarily to the capability to compensate for cross winds, to maintain control during takeoff, and to rapidly remove the aircraft from the runway after landing. In addition, there are often handling issues relating to the transport of the aircraft to and from a hanger or storage area. All these requirements exceed the capability of a simple wheeled support cart onto which the aircraft may be mounted while it is on the ground.

In the 1980's the Boeing Condor program used a ground cart to transport very large wingspan skid equipped aircraft while these were on the ground. This cart had limited capabilities and lacked several desirable features. It could perform some steering, but did not include significant cross wind-counteracting capability and required additional support equipment, such as a crane, to lift the aircraft onto or off the cart. The Condor cart system was basic and also lacked other features that might be desirable; for example, it did not provide for additional cooling or ventilation of the aircraft interior.

In addition a cart was developed in the 1995-6 period that could be used to launch a solar powered, light weight, unmanned air vehicle. This cart was essentially an automobile chassis platform (a Volkswagen Beetle) stripped down and outfitted with a vertical mast about 15 ft. (4.5 m) tall with a platform at its upper end on which the aircraft was balanced and mounted. This design is very limited in that the aircraft must be hoisted onto the platform so that the cart can be used to launch it.

Accordingly, it is desirable to develop a ground cart for use with skid equipped aircraft that assists in ground-based operations including launch and recovery. The cart should have several features, including ease of loading the aircraft to the cart, a capability to compensate for cross winds during launch and ground maneuvers, and the cart should also have options to provide additional services, like cabin environmental control. In addition, it is desirable that the cart be coupled to the aircraft by a simple robust mechanism and that it can be uncoupled automatically from the aircraft, as needed. Furthermore, other desirable features and characteristics of the present invention will become apparent from the subsequent detailed description and the appended claims, taken in conjunction with the accompanying drawings and the foregoing technical field and background.

BRIEF DESCRIPTION OF THE DRAWINGS

The following illustrative drawings are not to scale, and are intended only to facilitate an understanding of the invention. The drawings do not limit the scope of the invention, which is set forth in the claims appended here below. A more complete understanding of the present invention may be derived by referring to the detailed description and claims when considered in conjunction with the following figures, wherein like reference numbers refer to similar elements or elements with similar functions throughout the figures. The figures are schematic and may not include details that are not necessary for an appreciation on the invention.

SUMMARY OF THE INVENTION

In one embodiment, the invention presents a ground cart for use with skid-equipped aircraft. The ground cart has a load bearing chassis; and a platform mounted to the chassis. The platform has a first rotatable component and a second reciprocating component. The second component is supported by the chassis and the first component is rotatable relative to the second component, and supported by the second component. Further, the first platform component may have an array of lifters. First ends of the lifters releasably engage a complementary structure of an aircraft. In addition, the lifters may reciprocate. In embodiments, the cart may have a pair of outriggers to stabilize the cart. Each outrigger may have a first end releasably or hingedly coupled in a vicinity of a first end of the chassis.

The invention also provides methods of controlling on the ground a skid mounted, unmanned aircraft. In one embodiment the method includes towing a ground cart to a predetermined position beneath the aircraft. The ground cart has a rotating and reciprocating platform mounted to the cart where the platform includes a plurality of lifters. The cart also has a pair of outriggers; and a controller for applying controlled braking force to wheels of the cart. The method further entails raising the platform to permit the lifters to engage the aircraft to securely mount the aircraft on the platform; and conducting a maneuver with the mounted aircraft. The maneuvers may be any of: recovering the aircraft, taxiing the aircraft for take off, servicing the aircraft, moving the aircraft to storage, reorienting the aircraft to reduce cross wind effects, and reorienting the aircraft to facilitate hangar storage.

DETAILED DESCRIPTION

The following detailed description is merely illustrative in nature and is not intended to limit the invention or the application and uses of the invention. Furthermore, there is no intention to be bound by any expressed or implied theory presented in the preceding technical field, background, or the following detailed description.

The invention may be described herein in terms of functional and/or logical block components and various processing steps. It should be appreciated that such block components may be realized by any number of hardware, software, and/or firmware components configured to perform the specified functions. For example, an embodiment of the invention may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that the present invention may be practiced in conjunction with any number of data transmission protocols and that the system described herein is merely one exemplary application for the invention.

For the sake of brevity, conventional techniques related to signal processing, data transmission, signaling, network control, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in a practical embodiment.

The term "mechanically coupled" does not necessarily mean direct mechanical coupling; the coupling may be indirect with other structure interposed between two components that are nonetheless mechanically in communication or coupled to each other.

The term "complementary aircraft structure" or like language referring to structure that engages with lifters of a cart of the invention is not limited to only include components that are fixedly attached to the aircraft or that are necessary to the aircraft but also include removable components that are specifically adapted for cooperation with the lifters on the cart to enable safe and secure lifting and support of the aircraft on the cart. Such removable components that are also aircraft complementary structure are exemplified in the drawings and description below.

These ground carts and methods of the invention provide several advantages including: safe transportation and handling of a large wingspan, centerline skid-equipped aircraft in the airport area, compensation for crosswinds during takeoff taxiing, roll stability during towing, cooling and ventilation during ground movement or while holding for takeoff, rapid removal of the aircraft from the runway on landing, maintenance and utility and ease of access for maintenance. These advantages are expected to result in higher utilization of the aircraft, ease of maintenance and improved safety in ground handling operations.

Embodiments of the ground cart of the invention reduce support equipment requirements and provide a smaller logistic footprint, improve general utility for aircraft ground handling. Accordingly, the invention reduces operation and maintenance/support costs. Further, it reduces the risk to airport infra-structure through controlled cart braking, steering and stopping on the runway after aircraft launch. The ground cart also provides the capability to minimize risks of damage to aircraft during towing by providing pneumatic lift of the aircraft to a minimum of about six inches (155 mm) off the ground. In addition, the invention also allows options for cart control from the aircraft's navigation system, for example to provide for steering control until the aircraft is launched, cart braking, platform rotation, and other maneuvers. The ground cart may be steered remotely (from the air vehicle control system) for controlled takeoffs, for example, when the cart supports the aircraft. The cart may be equipped with sway braces that assist in stabilizing the aircraft on the cart during ground movement.

Further, an embodiment of the ground cart of the invention includes the ability to rotate the aircraft on a cart platform up to 90° from the direction of forward motion of the cart to facilitate movement in and around the airport apron/hangar. This rotatability feature is also useful in other areas, for example, to compensate for crosswinds when the cart supports an aircraft during takeoff. In general, platform rotatability provides better access for maintenance of the nose and other fuselage mounted equipment.

In some embodiments, the ground cart has a reciprocating platform. The cart may be towed to a position beneath an aircraft with the platform lowered so that the cart clears the underside of the aircraft and any of its protuberances. Raising the platform causes lifters or lift pads arrayed on the platform to engage aircraft lift positions and lift the aircraft off its skid(s). The aircraft mounted on the cart can then be maneuvered, as required. When the platform is in the raised position, it can also be rotated. This permits cross wind takeoffs and facilitates transport of the aircraft in confined areas. When the platform is in the retracted position, it nests within the cart chassis to minimize storage space.

In one embodiment, the cart is readily modified, for example by folding or detaching outriggers, to a smaller footprint to enhance storage and air transportability. Outriggers unfold or are reattached to provide a wider span between opposite wheels to improve stability.

An embodiment of the ground cart of the invention also provides for ancillary functions, for example ventilation and cooling during pre-flight/post-flight operations to maintain an aircraft interior environment free of fuel gas buildup. This service also provides additional cooling to the avionics and other on-board equipment.

Figure 1A:
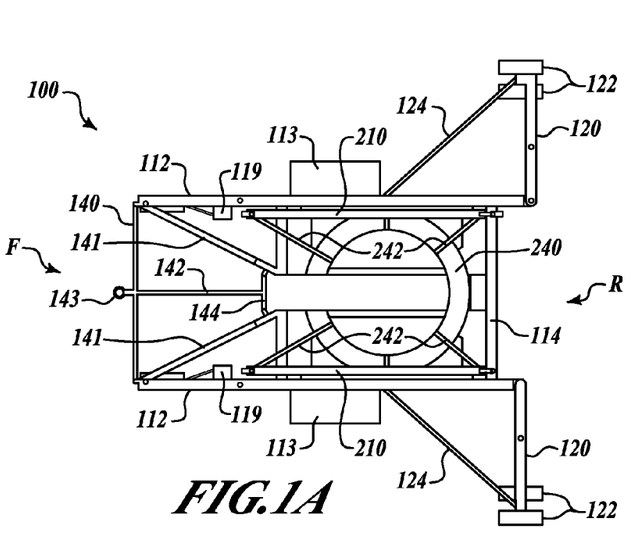
FIG. 1A is a top view of an embodiment of a ground cart of the invention.
Figure 1B:
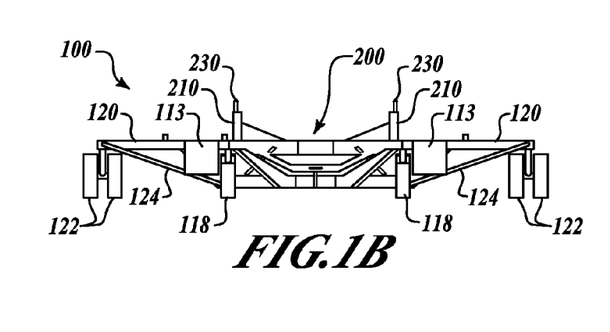
FIG. 1B is a front view of the cart of FIG. 1A.
Figure 1C:
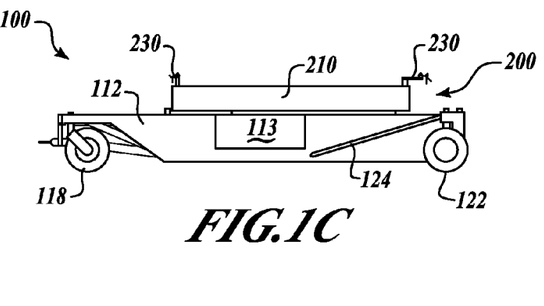
FIG. 1C is a side view of the cart of FIGS. 1A and B.

FIGS. 1A-C (platform raised), 2A (platform lowered), 2B (platform raised) and 3 (cart folded for storage) depict schematically various views of an example of a cart according to the invention, showing mechanical details. Referring to these six figures, the cart 100 has a load bearing chassis 110. The chassis 110 in this example is depicted as having a pair of opposed longitudinal side rails 112 with a cross brace 114 extending between and mechanically coupled to each rail 112 to form a u-shape. Of course, other chassis shapes are also within the scope of the invention, for example, rectangular chassis with two spaced apart cross braces forming a rectangle with a pair of side rails; or a pair of crossed braces forming an "X" with ends coupled to side rails, and the like. The chassis must be sufficiently robust to bear the imposed load which includes the weight of the aircraft and any other equipment carried on the cart 100. Each side rail has a rotatable wheel 118 mounted to the rail in the vicinity of or at the front end F (shown in FIG. 1A at the back of the drawing) of the cart 100. These wheels may be driven by a controlled motor (not shown) and/or may be steered by a controller (not shown) and/or may be equipped with a controller to activate brakes 119, as discussed below. In addition, each side rail 112 has an outrigger 120 coupled to its rear end (R depicts cart rear on FIG. 1A) or in the vicinity thereof. In the example, the outriggers 120 are hinged (hinges 121) to the side rails 112, but of course the outriggers 120 may also be mechanically coupled to the cart 100 in any releasable manner to permit reducing cart footprint. If cart footprint reduction is not an issue, fixed outriggers 120 may used. The outriggers 120 widen the cart's footprint at the rear and improve stability by reducing the risk of tipping over from one side to the other. Each outrigger 120 is fitted with at least one rotatable wheel 122, here shown at its outer extremity to maximize footprint and stability. In addition, each has a bar 124 that acts as a stop to prevent inboard rotation of the depicted hinged outrigger 120, when the cart 100 is in use. Non-hinged outriggers 120 that do not have a risk of pivoting out of position during use do not need a stop.

To facilitate towing, the cart 100 has a tow bar 140 at its front end, with opposite ends detachably coupled to side rails 112 (note that all the figures generally show the rear of the cart in the foreground to for purposes of clarity of outrigger detail). The tow bar 140 has a central connection to a longitudinally extending support bracket 142 (see, e.g. FIGS. 1A and 3) that is coupled mechanically at its inboard end to a lateral bracket 144. Lateral bracket 144 is mechanically coupled to the side rails 112, not necessarily directly, but via the base of the platform support. A bracket 141 extends diagonally from each end of the bracket 144 to nearest ends of the tow bar 140. The tow bar 140, diagonal brackets 141 and longitudinal bracket 142 are detachable so that they can be removed once the cart 100 is at the aircraft and being maneuvered underneath it to avoid interference with the landing gear of the craft. A clevis 143 attached to the center of tow bar 140 at the front F of the cart permits coupling of the cart to a tractor for towing the cart. Thus, for example, a tractor may tow the ground cart to the aircraft. The ground cart 100 is then detached from the tractor and maneuvered under the aircraft either from the front or rear of the craft, as may be most convenient. Further, the detachable tow bar 140 and related towing brackets 141, 142 may be detached to facilitate positioning the cart 100 under the craft and avoid the aircraft underside or any protuberances from it. Once the cart 100 is positioned so that lifters on the cart 100 are at least approximately aligned with complementary aircraft structure, the platform 200 may be reciprocated upward to engage lifters with the complementary structure, as described below in more detail with reference to figures.

Figure 2A:
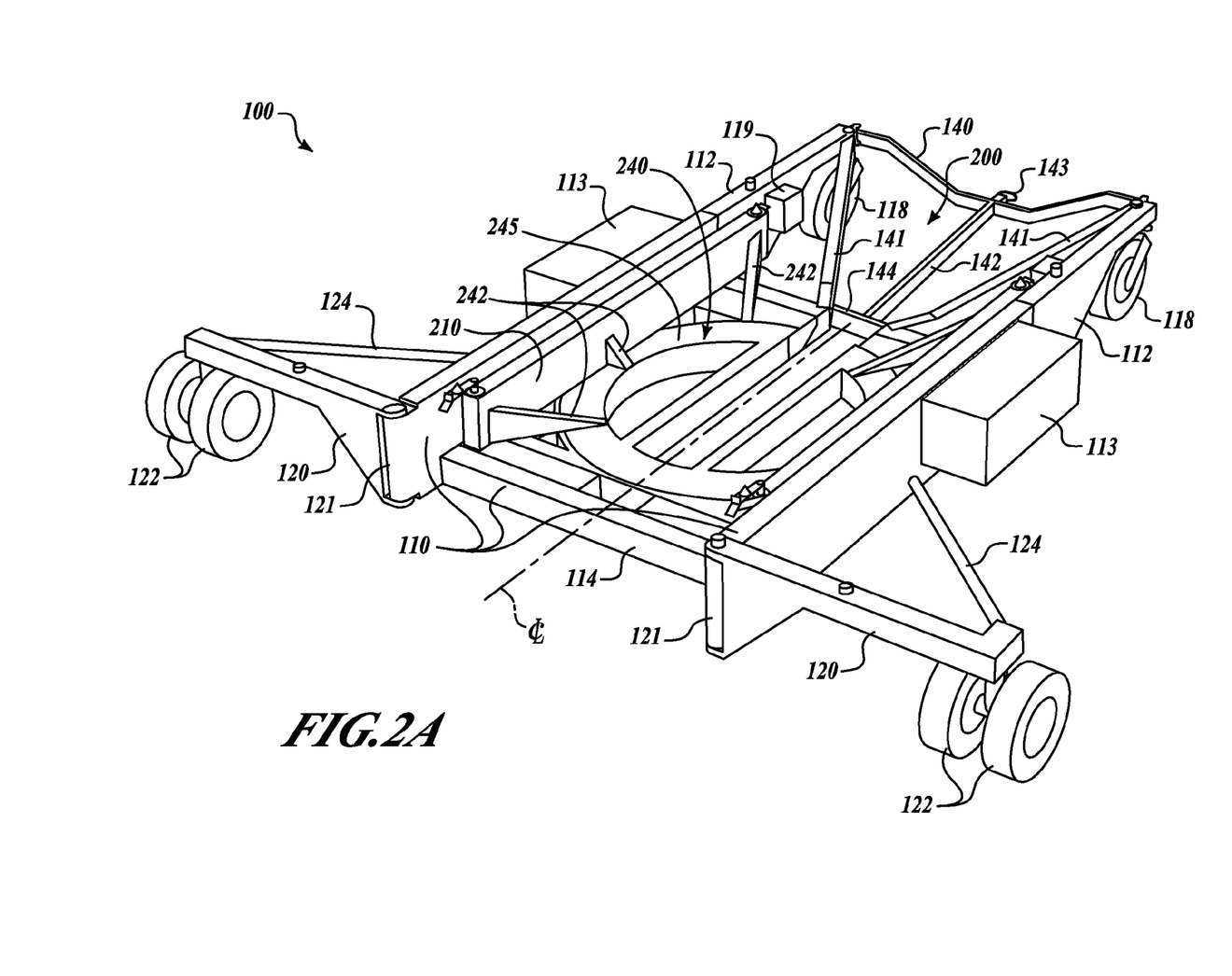
FIG. 2A is a perspective view of an embodiment of a ground cart of the invention, in ready-for-deployment configuration with platform lowered.
Figure 2B:
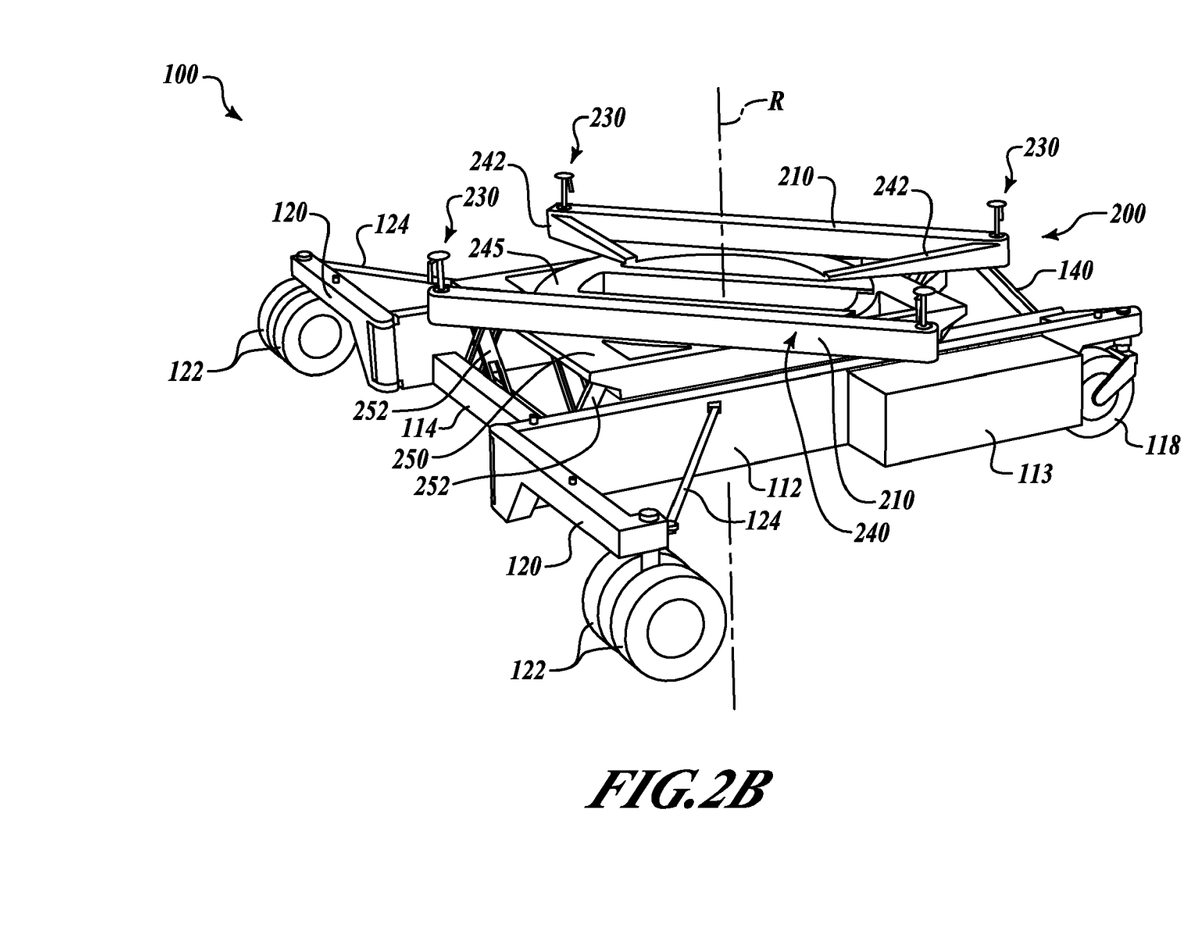
FIG. 2B is a perspective view of an embodiment of a ground cart of the invention, in ready-for-deployment configuration with platform raised.
Figure 3:
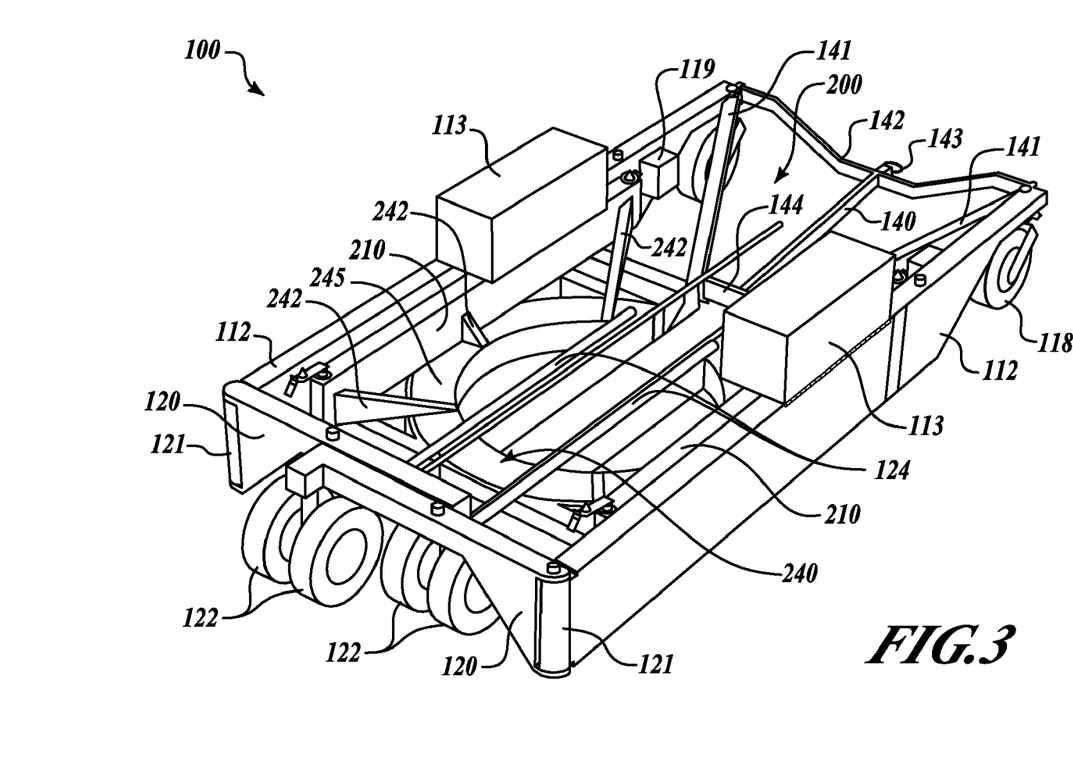
FIG. 3 is a perspective view of an embodiment of a ground cart of the invention, in a folded-for-storage configuration.

There are many possible platform configurations in accordance with the invention. In principle, according to the invention, the platform has about three layered components, although more can be used: a base component coupled mechanically to the cart structure (e.g. coupled to side rails 112) for support; an intermediate component that reciprocates with respect to the base component and that rests on the base when the cart is "folded" for storage; and a rotating component that is located above the intermediate component, and that rotates relative to the intermediate component. With these principles in mind, the figures depict an example of a platform 200 supported on the chassis 110. In the example shown, the platform 200 has a generally rectangular shape to fit within the chassis 110 to provide a compact design that enhances stability in use and reduced footprint in storage. The center of mass of the platform 200 lies about midway between the side rails 112 and the platform 200 is essentially symmetrical on either side of an axis parallel to and midway between the rails 112. The platform 200 in this embodiment (see especially FIG. 2A) has an upper rotatable platform component 240. The upper component 240 has a pair of parallel outboard support beams 210 mechanically coupled to lateral support brackets 242 that together form a "cradle" (seen lifted and rotated in FIG. 2B) with a shape that substantially conforms to the outer surface of the aircraft to be lifted onto the cart 100, to avoid such structural contact that might cause damage to the aircraft skin. The side beams 210 in this embodiment are mechanically coupled by brackets 242 to the central turntable 245 of upper component 240. The central turntable 245 has a central axis of rotation R shown in FIG. 2B. In the example of FIG. 2 B, the axis of rotation R is located midway between the support beams 210 for increased stability. As seen in FIGS. 1B, 1C and 2B, components of the platform 200 can be raised to extend above side rails 112. As shown in FIG. 3, when the platform 200 is retracted, its components nest between side rails 112 in the cart 100 to minimize cart 100 storage space needs.

Referring more particularly to FIG. 2B, the platform 200 is depicted as having raised component 240 and rotated it about its axis of rotation R that is located between the side rails 112. The upper platform component 240 rests on a support component 250 relative to which it can rotate. In the embodiment shown, the support 250 does not rotate, but it does reciprocate to lift the platform 200. In the example shown, the support 250 has two pairs of scissor jacks 252, one pair at the front, and another pair at the rear so that one scissor jack 252 is mechanically coupled proximate each corner of the support 250. This is also seen more clearly in FIG. 4C. Thus, as the scissor jacks 252 open and close, the platform component 250 reciprocates. As inboard ends of the scissor jacks 252 slide inboard (i.e. the "scissor" opens), the support 250 (and upper platform component 240) lowers, and as the inboard ends slide outboard (i.e. the "scissor" closes), the support 250 (and upper platform component 240) rise. Movement of the scissor jacks 252 may be controlled by a motor (not shown) or hydraulic or pneumatic means (not shown) that may be remotely controlled or controlled by a local operator. Of course, other platform reciprocation arrangements may also be used, for example electromechanical means (e.g. screw jacks driven by servo motors).

Upper platform component 240 is rotatably coupled to support platform component 250. An operator or controller may control the rotation of upper platform component 240 relative to platform component 250 in any of a variety of ways. For example, a motor may drive a gear that engages a drive gear of the platform component 240 to control both speed and degree of rotation; a motor may drive a pulley that rotates the platform component 240, and the like. The platform component 240 may also be rotated manually, and a stop mechanism may be used to lock the platform into position.

Figure 4A:
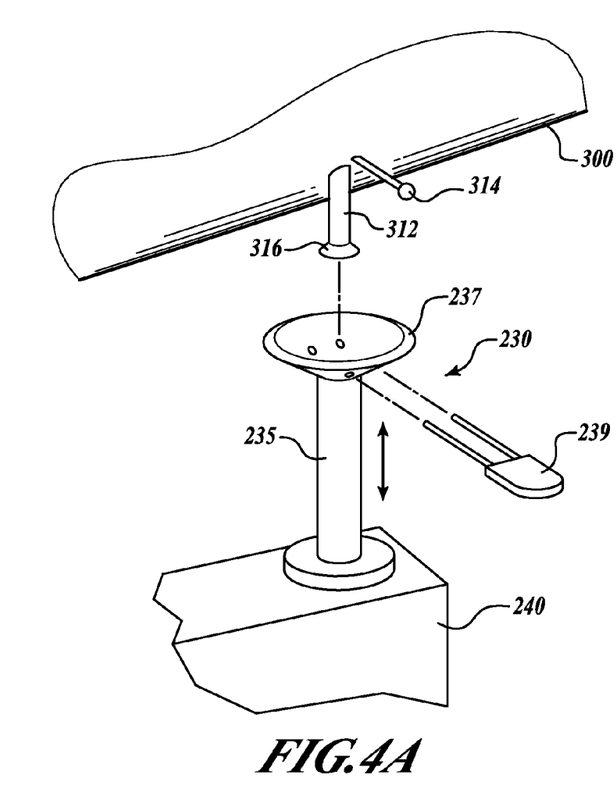
FIG. 4A is a perspective view of a lift locking mechanism for attaching a ground cart to an aircraft, with cart and aircraft coupling components not engaged, in accordance with an embodiment of the invention.
Figure 4B:
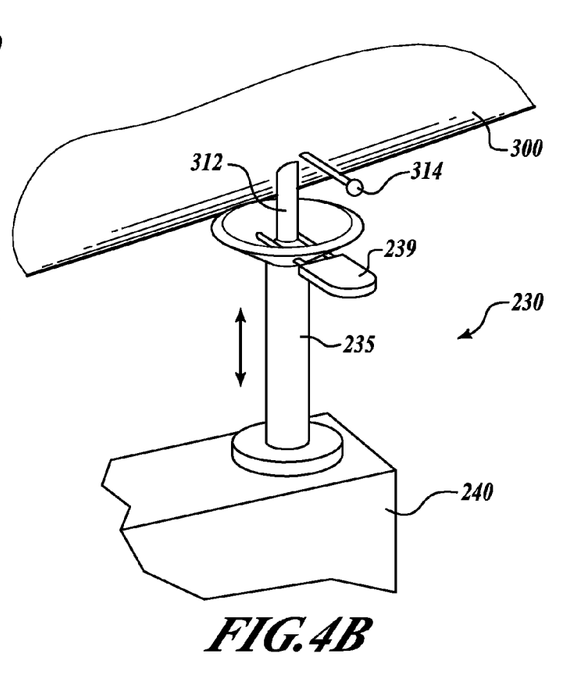
FIG. 4B is a perspective view of the lift locking mechanism of FIG. 4A for attaching a ground cart to an aircraft, with cart and aircraft coupling components engaged, in accordance with an embodiment of the invention.

Referring now to FIGS. 4C, 4D, 6, and 7 there are depicted mechanical means to securely and releasably hold the aircraft 300 to the cart 100. The invention provides lifters 230 on the upper platform component 240 of cart 100. These may be arrayed at corners of component 240, for example, to engage complementary structure of the aircraft. One corner with an example of a lifter is shown in FIGS. 4A and B. In the non-connected position, a headed pin 312 with wide head 316 is inserted substantially vertically within a bore in the aircraft structure at a support location. The bore has a lateral intercepting bore that receives a fixing pin 314. The fixing pin 314 enters into a bore (not shown) in the headed pin 312 to fix the headed pin in place in the aircraft bore, as shown in FIG. 4A. The platform upper component 240 has a lifter 230 with a cup 237 mounted to a vertical cylinder 235, that may reciprocate in some embodiments to facilitate engagement with aircraft complimentary structure, like headed pin 312. The cup 237 has an opposed pair of holes, as shown, to receive tines of a locking key 239. Thus when the head 316 of headed pin 312 is guided and inserted into a nesting recess within cup 237, the tines of locking key 239 are inserted into the holes to lock the headed pin 312 to the cup 237, as shown in FIG. 4B. The locking key 239 may be removed by a controller, if the cart is used to launch the aircraft, when sufficient lift is sensed. This separates the cart 100 from the craft 300 automatically and safely.

Figure 4C:
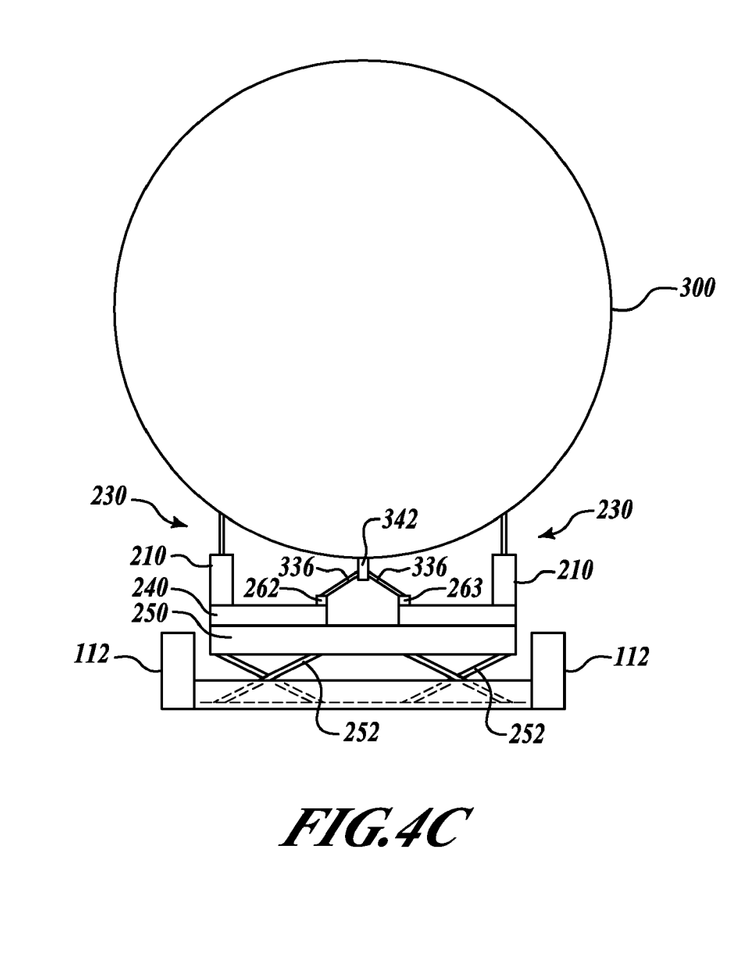
FIG. 4C is a schematic partial front view of an aircraft mounted to an upper portion of a cart (shown in partial cross section) using a strap as a clamping mechanism for securing the aircraft to the cart, along with lifters, in accordance with an embodiment of the invention.

FIG. 4C depicts an additional device for holding the aircraft to the cart especially in cross wind conditions. The device is a releasable strap 336 that has a first end tethered to the cart at attachment point 262 and a second end clasped releasably to an opposite attachment end 263. The mid point of the strap 336 passes through the eye of a bracket 342 under the aircraft 300, and thus secures the aircraft to the cart 100. This strap may be released with a controller that activates the release clasp at end 263 so that the cart 100 is freed from the aircraft in maneuvers, such as launch, when lift off is sensed.

Figure 4D:
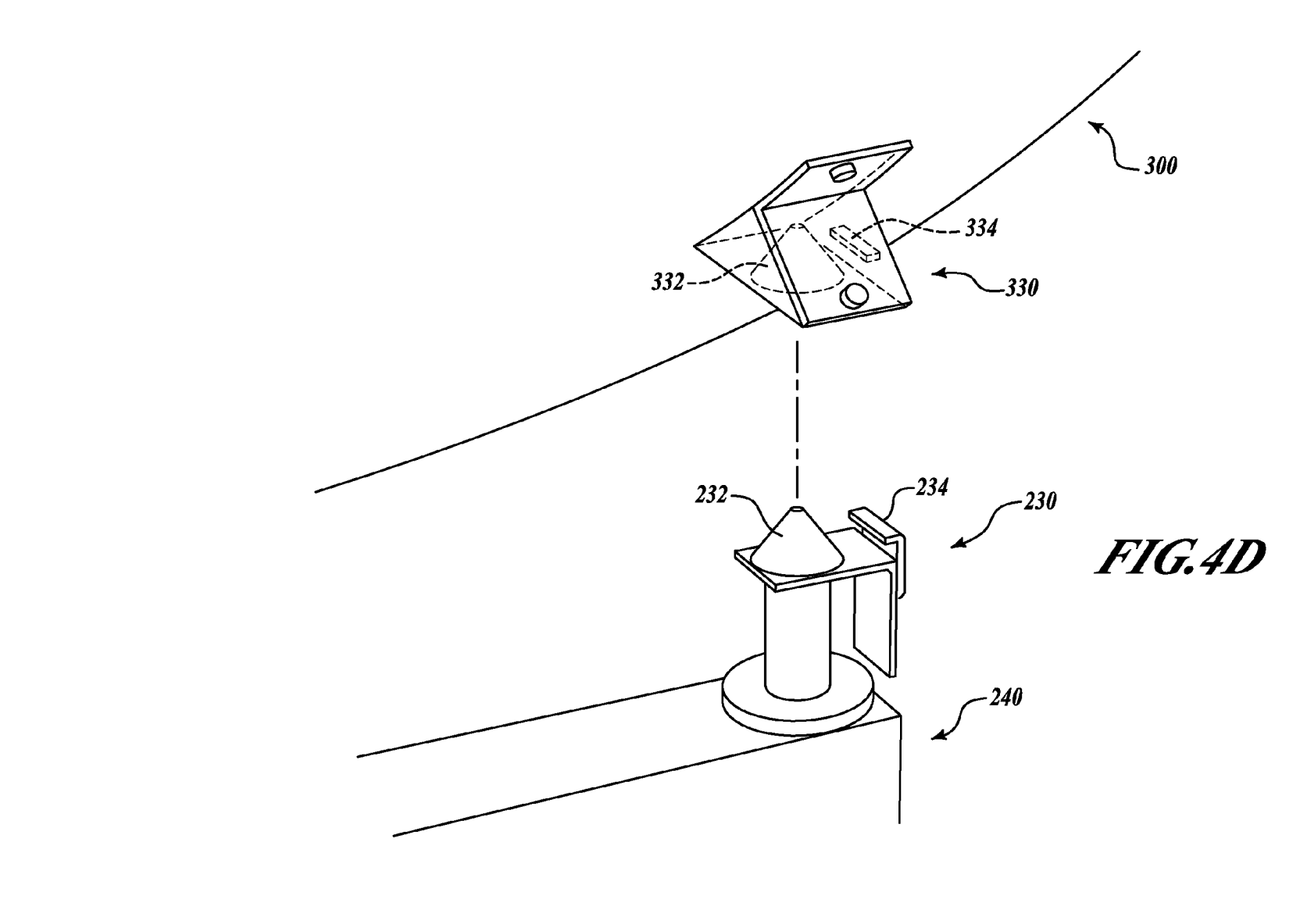
FIG. 4D is a perspective view of an alternative lift locking mechanism for attaching a ground cart to an aircraft, in accordance with an embodiment of the invention.

In addition, an alternative example is shown in detail in FIG. 4D, where the upper platform component platform 240 has an array of lifters 230 designed to engage cooperating structure 330 on the aircraft 300 to hold the aircraft in position while the platform is reciprocated to lift the aircraft. As shown, the lifters 230 are arrayed in a rectangle, one at each corner of the platform 200. Of course, other stable arrangements of lifters 230 are also useful. In normal operation, the cart 100 is maneuvered into position under an aircraft 300 and once in position, the platform 200 is slowly raised while the lifters 230 are positioned relative to cooperating support structure 330 on the aircraft fuselage that are located at appropriate positions on the air frame where they can support the weight of the aircraft 300. In the embodiment shown in FIG. 4D, the lifters include a conical head 232 (for example of an elastomeric, or other yielding polymeric material) that can be eased into a receiving cavity 332 of the cooperating structure 330. Other lifters and lifters with differently shaped heads are of course also useful, but cones have an advantage in being "self centering" in this application so that very precise alignment of all four lifters with the cooperating structure is not necessary. Once the four cones 232 are in place within cavities 332, the over center clamps 234 are engaged with slots 334 in the cooperating structure 330. This holds the lifter 230 securely within the aircraft cooperating structure 330. These clamps 234 may be operated, or at least released, by a mechanism that is controlled remotely so that the clamps disengage 234 when the aircraft 300 is about to take off, for example, if the cart 100 is used in launch or taxiing operations.

As shown in FIG. 3, the cart 100 may be folded to reduce footprint. The outriggers 120 are folded inboard around hinges 121, and the bars 124 are moved. Further, the containers 113 (which may be used for any purpose, such as tool storage, containment of ancillaries (compressed air, etc.) and the like) are pivoted upward and inboard to rest upon side rails 112.

Figure 5:
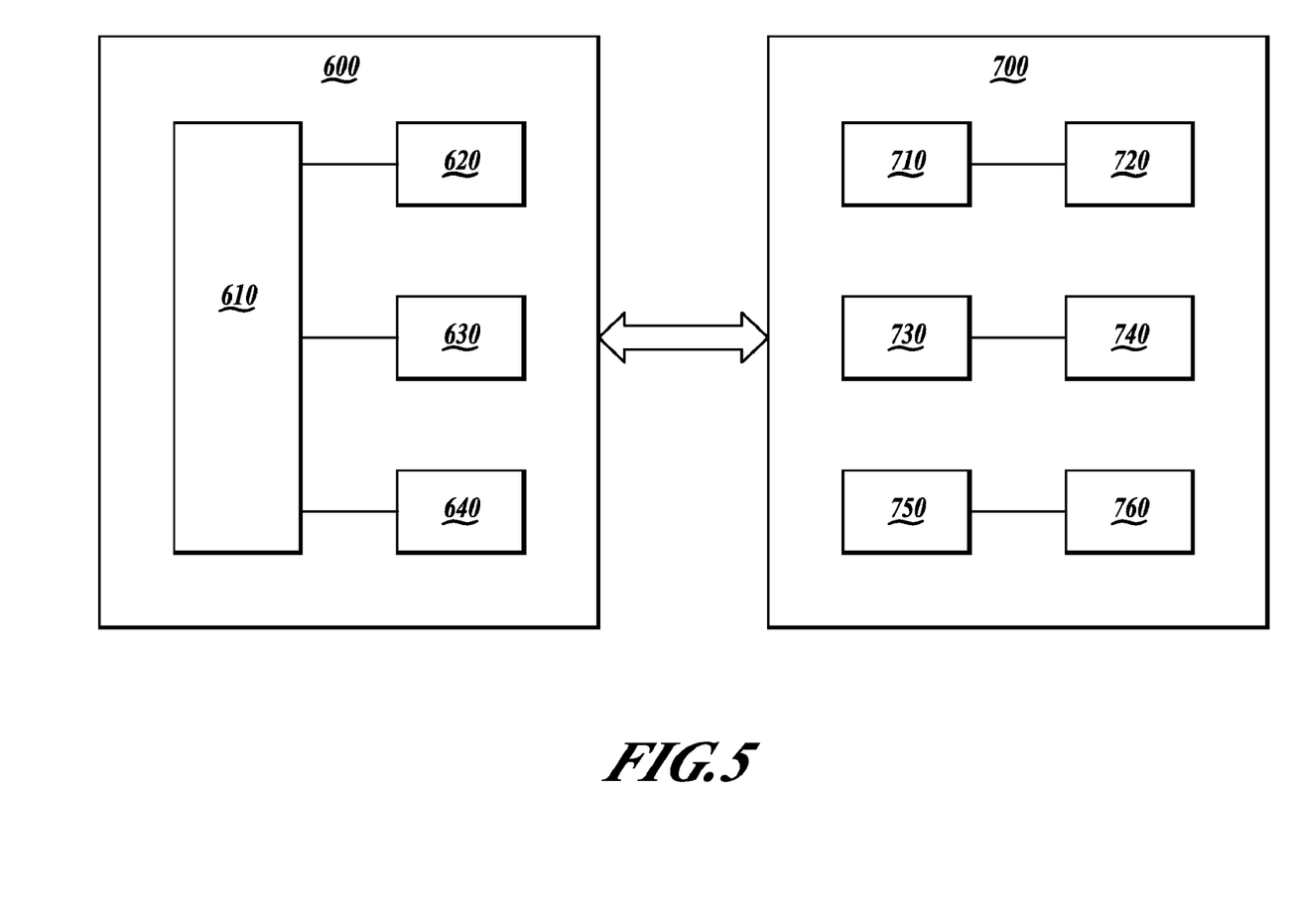
FIG. 5 is a schematic block diagram of an embodiment of control interfaces between the cart and the aircraft controls.

FIG. 5 is a block diagram illustrating communications between an aircraft control system 600 and a system 700 of controllers 710, 730, 750 on the cart 100. The aircraft system 600 in this embodiment has a control interface 610 for input of signals and information, and output of information in any useful format. The control interface 610 may receive input from an operator in a remote location via wireless transmission. The control interface is in turn communication with a plurality of aircraft controllers 620-650 and sensors (not shown), illustrated here as three controllers, but there may be many more or fewer. The sensors may for example sense wind direction and strength and relay information to the interface 610 which could further transmit information to a remote operator and/or to a cart controller 710-750. The aircraft controllers 620-640 may, for example include an appropriate controller 620, linked to a sensor for detecting aircraft lift off. Upon lift off, or incipient lift off, the aircraft controller 620 may direct a controller 710 on the cart 100 to control servomotor 720 to apply brakes to the cart wheels and may also direct controller 730 to control a servo-mechanism 740 to disengage the lifters from the aircraft 300. Indeed, the system may be used to disengage any type of coupling between the aircraft 300 and the cart 100 at incipient lift off, not only those illustrated by examples. The system may also be used to steer the cart 100 for example, by transmitting information to an appropriate one of controllers 710, 730, 750 on the cart that control the wheel angle for steering of either front 118 or rear wheels 122 or both sets of wheels. This controlled steering feature is useful for example in aircraft maneuvers on take off and also on maneuvers on the ground while transporting the aircraft 300.

The cart control system 700 may be in communication with an operator on the ground or remote from the cart 100, to direct cart operations. Communication may be wired or wireless using any suitable protocol. If communication is from the aircraft controls 600 to the cart 100, communication may be via an umbilical, wired or wireless.

Figure 6:
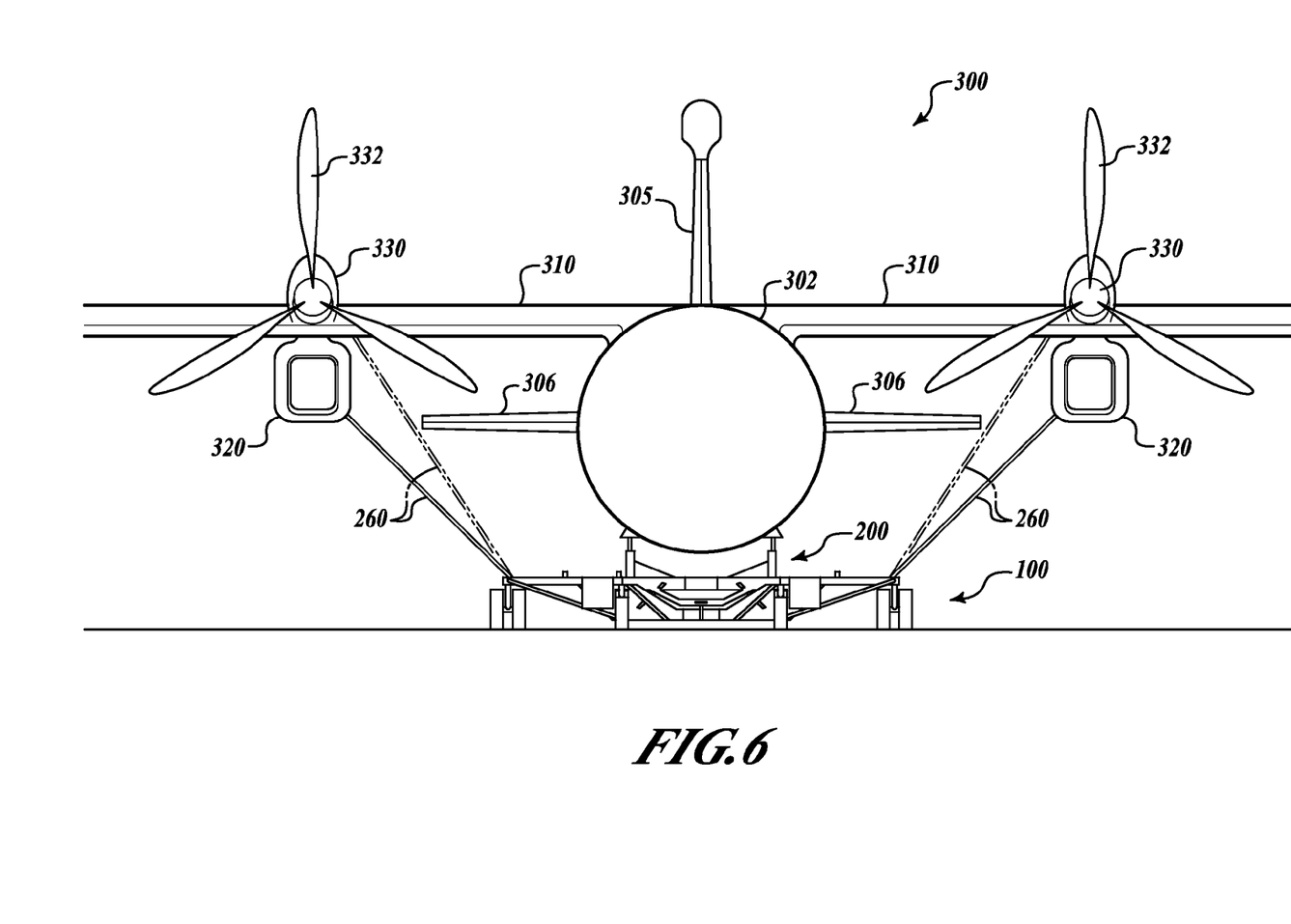
FIG. 6 is a schematic depiction in perspective view of a skid equipped aircraft mounted onto a ground cart, in accordance with the invention.
Figure 7:
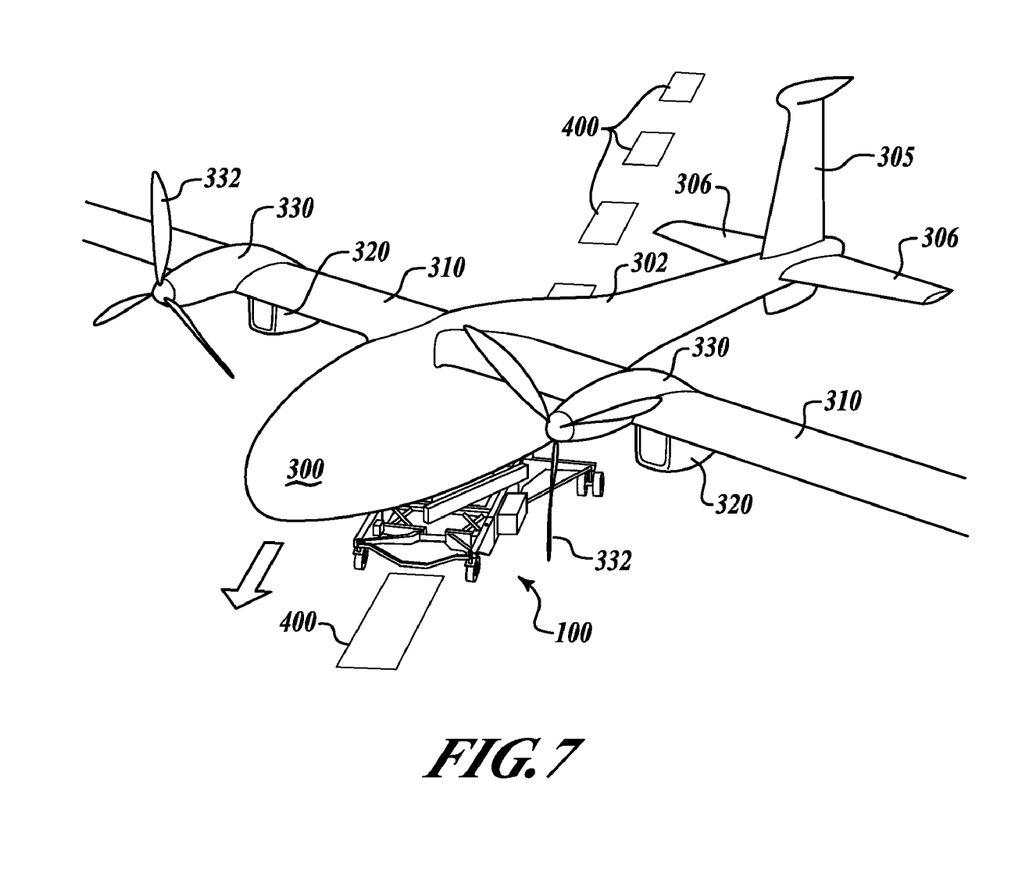
FIG. 7 is another schematic depiction in perspective view of a skid equipped aircraft mounted onto a ground cart, in a maneuver in accordance with the invention.

FIGS. 6 and 7 depict an aircraft 300 loaded onto the cart 100 in maneuvers. In FIG. 6, the aircraft 300 has a pair of wings 310 extending out from fuselage 302. To each of the wings 310 is attached an engine nacelle 320. The aircraft shown is equipped with impellers 332. Further, the illustrated fuselage 302 has a rear rudder 305 and stabilizers 306. The aircraft 300 is mounted to platform 200 which is in the raised position on cart 100. In addition, a pair of sway bars 260 extends from inboard ends mechanically attached to the cart 100 to outboard ends mechanically attached to the nacelles 320 or to the wings (broken lines) at appropriately configured attachment points. These detachable sway bars 260 enhance stability of the craft 300 on the cart 100. In this stable position, the cart 100 can maneuver the mounted aircraft 300 with significantly less hindrance or interference from landing strip or terrain obstacles.

As shown in FIG. 7, when the aircraft 300 is taxiing for take off (i.e. a launch maneuver in direction of the arrow) the cart 100 may be aligned with the runway (depicted as aligned with strips 400 along the runway). However, in the event that there is a crosswind, the upper component 240 of platform 200 of the cart 100 may be rotated to minimize wind effects, e.g. by turning into the wind. Thus, the aircraft 300 can taxi along the runway with reduced cross wind related risks.

In one embodiment, the invention provides a ground cart that has a load bearing chassis; and a platform mounted to the chassis. The platform has a first rotatable component and a second reciprocating component. The second component is supported by the cart chassis and the first component is rotatable relative to the second component, and supported by the second component. Optionally, the first platform component further comprises an array of lifters. First ends of the lifters may have means for releasably engaging a complementary structure of an aircraft. The first ends of the lifters may also reciprocate. In addition, the cart may have a pair of outriggers, each outrigger having a first end releasably or hingedly coupled in a vicinity of a first end of the chassis. The optional pair of outriggers may each be pivotally coupled to the chassis such that each pivots to extend outboard from and at substantially right angles to a longest side of the chassis when the cart is in use, and pivot to extend inboard from the longest side of the chassis when folded.

The cart may further include a controller that controls braking of wheels of the cart. The cart may also further have a first controller that controls rotation of the first component of the platform and optionally a second controller that controls reciprocation of the second component of the platform. Cart controllers may release the lifters from engagement with the aircraft. And, a cart controller may control steering of wheels of the cart.

In another embodiment, the invention provides a ground cart that has: a pair of opposed longitudinal side rails, each having first and second ends; at least one lateral rail coupled to and extending between the side rails; a rotatable platform component mounted to the cart with an axis of rotation between the side rails, the platform component comprising an array of lifters; a pair of outriggers, each outrigger having a first end releasably or pivotally coupled in a vicinity of a first end of a side rail; and a wheel at a second end of each outrigger. Optionally, the array of lifters includes at least four lifters in a rectangular array. The first ends of the lifters may have means for engaging and gripping a complementary structure of an aircraft. The lifters may also reciprocate.

The cart may also include controllers to control steering of the cart. Controllers and brakes for braking at least one pair of wheels of the cart. Optionally it may also have a controller for releasing engagement of the lifters from aircraft complementary structure, when lift off is sensed.

In addition, the rotatable platform component of the cart may be mechanically coupled to a second platform component that reciprocates relative to the side rails.

The invention also provides methods of controlling on the ground a skid mounted, unmanned aircraft. The method includes: towing a ground cart to a predetermined position beneath the aircraft, raising the platform to permit lifters to engage the aircraft to securely mount the aircraft on the platform, and conducting a maneuver with the mounted aircraft. The maneuver may be any of: recovering the aircraft, taxiing the aircraft for take off, servicing the aircraft, moving the aircraft to storage, reorienting the aircraft to reduce cross wind effects, and reorienting the aircraft to facilitate hangar storage. The ground cart used in the maneuver has a rotating and reciprocating platform mounted to the cart. The cart platform has a plurality of lifters; a pair of outriggers, each outrigger having a first end pivotally or releasably coupled in a vicinity of a first end of the cart, the outrigger extending outboard when the cart is in use; and a controller for applying controlled braking force to wheels of the cart. The method has the option of controlling the cart maneuvers remotely.

While at least one example embodiment has been presented in the foregoing detailed description, it should be appreciated that a vast number of variations exist. It should also be appreciated that the example embodiment or embodiments described herein are not intended to limit the scope, applicability, or configuration of the invention in any way. Rather, the foregoing detailed description will provide those skilled in the art with a convenient road map for implementing the described embodiment or embodiments. It should be understood that various changes can be made in the function and arrangement of elements without departing from the scope of the invention as set forth in the appended claims and the legal equivalents thereof.

What is claimed is:

1. A ground cart comprising:
a load bearing chassis; and
a rotatable and reciprocating platform, the platform supported by and rotatable coupled to a reciprocating component, the reciprocating component supported by the chassis and the reciprocating component reciprocating relative to the chassis, said platform rotating relative to said reciprocating component;
wherein the rotatable and reciprocating platform comprises an array of vertically reciprocating lifters.

2. The cart of claim 1, wherein the lifters comprise first ends, the first ends of the lifters comprising means for releasably engaging a complementary structure of an aircraft.

3. The cart of claim 2, wherein first ends of the lifters reciprocate and are configured to engage aircraft complementary structure releasably.

4. The cart of claim 2, further comprising a controller to release the lifters from engagement with complementary structure of the aircraft.

5. The cart of claim 1, further comprising a pair of outriggers, each outrigger having a first end releasably or hingedly coupled in a vicinity of a first end of the chassis.

6. The cart of claim 1, further comprising a pair of outriggers wherein each outrigger is pivotally coupled to the chassis such that each outrigger pivots to extend outboard from and at substantially right angles to a longest side of the chassis when the cart is in use, and pivots to extend inboard from the longest side of the chassis when folded.

7. The cart of claim 1, further comprising a controller that controls braking of wheels of the cart.

8. The cart of claim 1, further comprising a first controller that controls rotation of the platform and a second controller that controls reciprocation of the platform.

9. The cart of claim 1, further comprising a controller that controls steering of wheels of the cart.

10. A ground cart comprising:
a pair of opposed longitudinal side rails, each having first and second ends;
at least one lateral rail coupled to and extending between the side rails;

a rotatable platform component mounted to the cart with an axis of rotation between the side rails, the platform component comprising an array of lifters wherein the lifters reciprocate and are configured to engage aircraft complementary structure releasably;

a pair of outriggers, each outrigger having a first end releasably or pivotably coupled in a vicinity of a first end of a side rail; and a wheel at a second end of each outrigger.

11. The cart of claim 10, wherein the array of lifters comprises at least four lifters in a rectangular array.

12. The cart of claim 10, wherein first ends of the lifters comprise means for engaging and gripping a complementary structure of an aircraft.

13. The cart of claim 10, further comprising controllers to control steering of the cart.

14. The cart of claim 10, further comprising a braking controller and brakes for braking at least one pair of wheels of the cart.

15. The cart of claim 10, wherein the rotatable platform component is mechanically coupled to a second platform component that reciprocates relative to the side rails.

16. The cart of claim 10, further comprising a controller for releasing engagement of the lifters from aircraft complementary structure.

17. A method of controlling on the ground a skid mounted, unmanned aircraft, the method comprising:

towing a ground cart to a predetermined position beneath the aircraft, the ground cart comprising:

a rotating and reciprocating platform mounted to the cart, the platform comprising a plurality of lifters;

a pair of outriggers, each outrigger having a first end releasably or pivotably coupled in a vicinity of a first end of the cart, each outrigger extending outboard when the cart is in use; and a controller for applying controlled braking force to wheels of the cart;

raising the platform to permit said lifters to engage the aircraft to securely mount the aircraft on the platform; and conducting a maneuver with the mounted aircraft, the maneuver comprising any of: recovering the aircraft, taxiing the aircraft for take off, servicing the aircraft, moving the aircraft to storage, reorienting the aircraft to reduce cross wind effects, and reorienting the aircraft to facilitate hangar storage.

18. The method of claim 17, wherein the conducting comprises controlling the conducting of maneuvers remotely.

* * * * *

UNITED STATES PATENT AND TRADEMARK OFFICE
CERTIFICATE OF CORRECTION

PATENT NO. : 7,607,608 B2
APPLICATION NO. : 11/420667
DATED : October 27, 2009
INVENTOR(S) : Morris et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 475 days.

Signed and Sealed this

Twelfth Day of October, 2010

David J. Kappos
*Director of the United States Patent and Trademark Office*